United States Patent [19]

Adachi

[11] 4,310,871

[45] Jan. 12, 1982

[54] ILLUMINATING DEVICE FOR INSTRUMENT

[75] Inventor: Masahiro Adachi, Yokosuka, Japan

[73] Assignee: Nissan Motor Co., Ltd., Japan

[21] Appl. No.: 90,474

[22] Filed: Nov. 1, 1979

[30] Foreign Application Priority Data

Nov. 6, 1978 [JP] Japan .................................. 53-135715
Nov. 14, 1978 [JP] Japan .................................. 53-139300

[51] Int. Cl.³ ............................................ G01D 11/28
[52] U.S. Cl. ......................................... 362/23; 362/26; 362/80; 350/345
[58] Field of Search ....................... 362/80, 23, 26, 27, 362/28, 29, 31; 350/345

[56] References Cited

U.S. PATENT DOCUMENTS 2,652,652  9/1953  Lasko ..................................... 362/27
3,853,088  12/1974  Marko .................................... 362/27
3,994,564  11/1976  Somogyi .............................. 350/345

Primary Examiner—Donald P. Walsh
Attorney, Agent, or Firm—Lane, Aitken, Kice & Kananen

[57] ABSTRACT

An illuminating device for an instrument of a vehicle or the like using a light guiding member for introducing outside light during the day time to illuminate the dial of the instrument clearly at a brightness matching with that of the scenery. An internal light source is provided to illuminate the same dial in a dark place.

7 Claims, 16 Drawing Figures

FIG._1
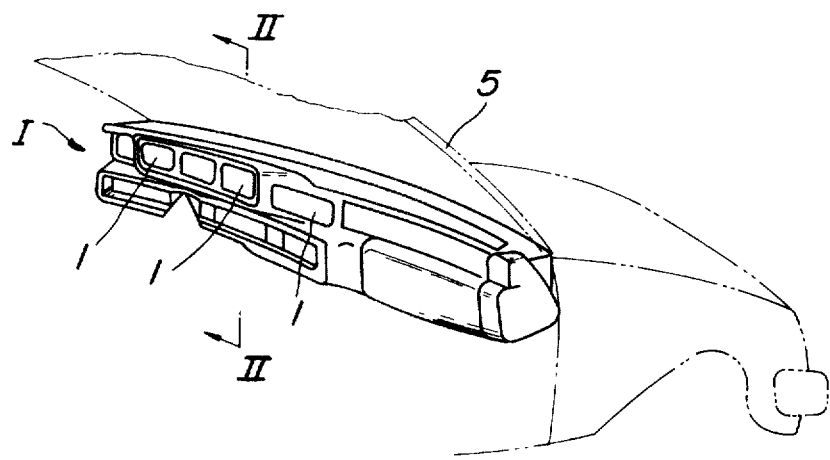
FIG._2
PRIOR ART
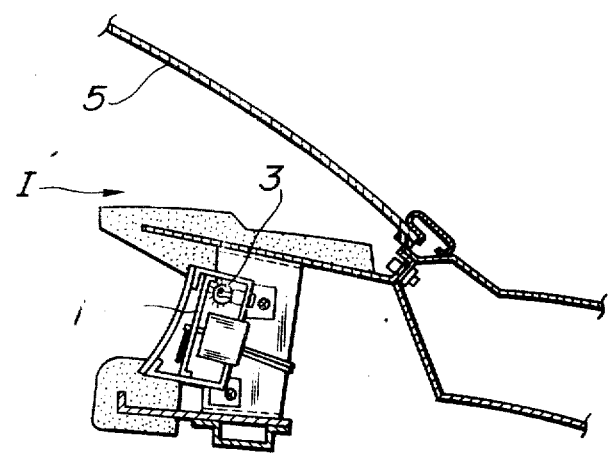

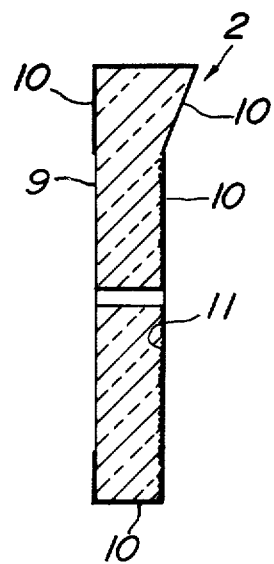
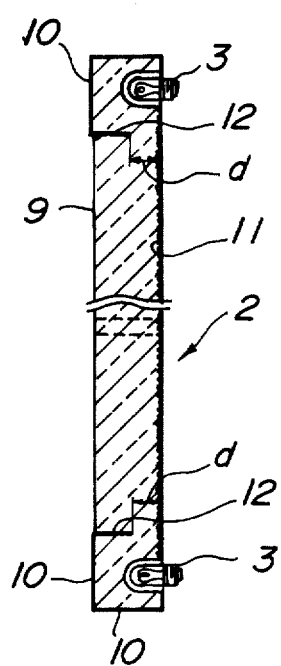
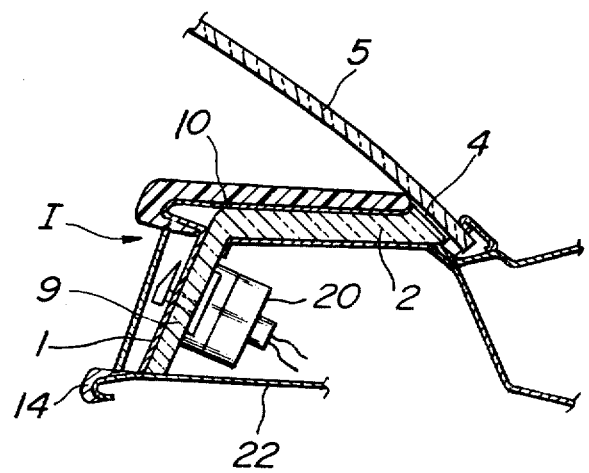

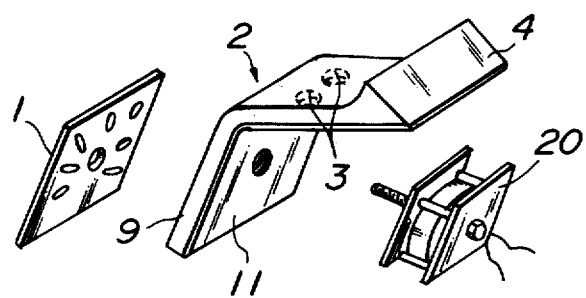
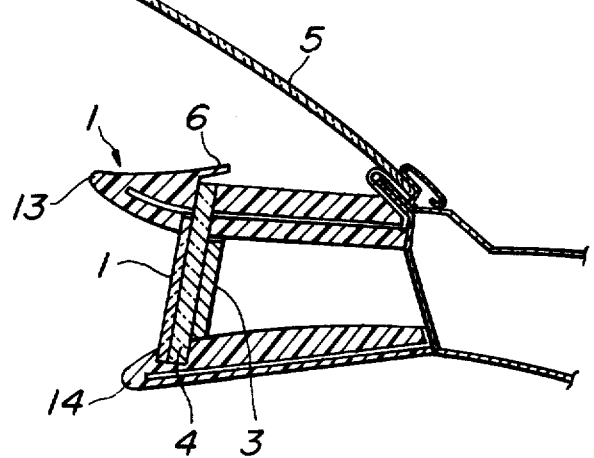

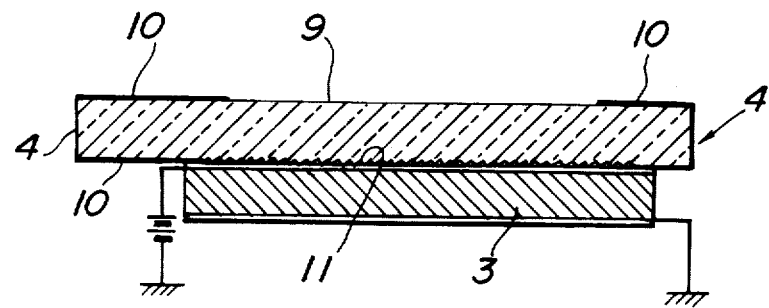
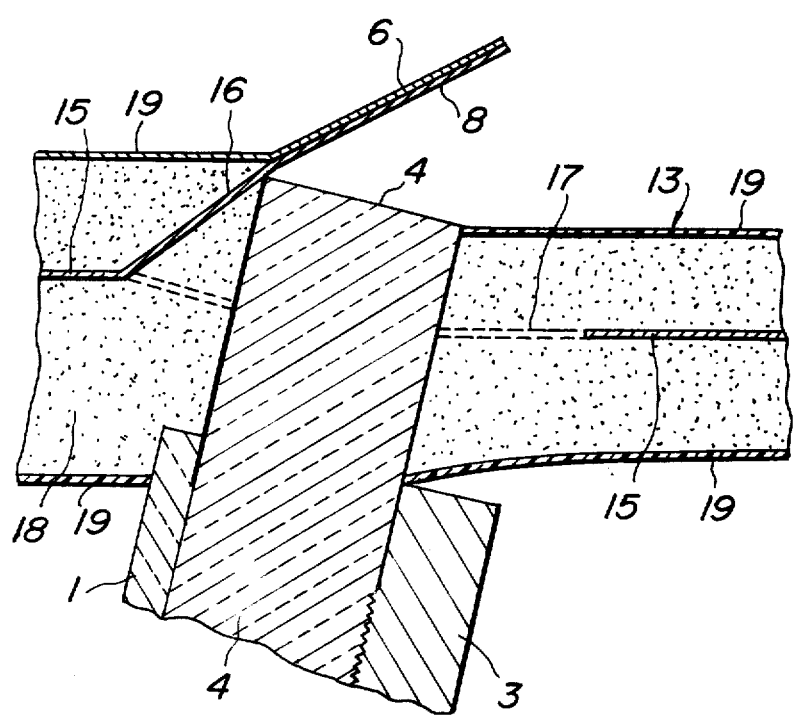

4,310,871

ILLUMINATING DEVICE FOR INSTRUMENT

BACKGROUND OF THE INVENTION

1. Field of the Invention

The present invention relates to an illuminating device for an instrument of an automotive vehicle, aeroplane, ship, or the like.

2. Description of the Prior Art

An automotive vehicle or the like is equipped with instruments in the instrument panel in front of the driver's seat such as a speed meter, a fuel indicator, a thermometer for indicating the temperature of the cooling water and other various meters and indicators.

As for an example, FIG. 1 shows an arrangement of the instruments in the instrument panel generally indicated the Roman reference numeral I in the front of a cabin of a vehicle or the like. The instruments are mounted inside the instrument panel located below the windshield 5. In front of the instrument panel, indicating plates or dials 1 of the meters, such as a speed meter, fuel indicator, thermometer and other various meters are equipped.

FIG. 2 shows a cross-sectional view of such an instrument panel of the conventional type. The conventional illuminating device is substantially as shown in FIG. 2. Namely, an internal light source 3 such as a lamp is arranged inside the instrument I so as to illuminate an indicating element of the indicating plate or dial 1 formed by a light transmissive plate such as a transparent plate or a liquid crystal panel so as to clearly show the indication appearing on the dial 1 even in a dark place at night.

In such a conventional illuminating device for an instrument, the indicating portion of the indicating plate or dial 1 may be illuminated to show clearly by the internal light source 3 at night time when the vehicle light is turned on. However, at day time when the internal light source is not switched on, the indication on the dial 1 should be confirmed by the day light in the cabin. In this case, the pupil of the driver varies mainly depending on the brightness of the front view or scenery. Accordingly, in case the front view is very bright scenery compared with the light in the cabin, such as for instance, on a very fine day, the driver may feel difficulty in identifying the indication on the dial or it might be invisible momentarily when the driver turns his eye upon the indicating panel or dial.

SUMMARY OF THE INVENTION

The present invention is to improve such a conventional illuminating device for an instrument of a vehicle or the like. According to the present invention, an illuminating device for instruments of a vehicle is provided, in which outside light is introduced for illuminating the indication of the dial under bright day light, whereas an internal light fed by an internal light source is used for illuminating the instrument in a dark circumstance.

Accordingly, the basic construction of the present invention is to arrange a light guiding member at the backside of a dial formed of a transparent plate or a liquified crystal panel mounted in front of an instrument, and to provide an internal light source for the light guiding member. Further the invention is to make an edge surface of the light guiding member as a light introducing portion and arrange it to extrude from the top portion of the instrument panel and to arrange the outside light to become incident thereon.

BRIEF DESCRIPTION OF THE DRAWINGS

The invention will now be explained by referring to the accompanied drawings, in which:

FIG. 1 is a perspective view showing a general instrument panel of a vehicle;

FIG. 2 is a cross-sectional view along line II—II of FIG. 1 for explaining a conventional illuminating device;

FIG. 5 is a cross-sectional view taken along line V—V of FIG. 4;

FIG. 6 is a cross-sectional view taken along line VI—VI of FIG. 4;

FIG. 7 is a cross-sectional view corresponding to FIG. 2 for explaining a second embodiment of the present invention;

FIG. 8 is a perspective view for showing the photo-conductive member of the second embodiment;

FIG. 9 is a cross-sectional view corresponding to FIG. 2 for explaining a third embodiment of the present invention;

FIG. 10 is a cross-sectional explanatory view for showing the light guiding member of FIG. 9 and the internal light source provide at the backside thereof;

FIG. 11 is an enlarged cross-sectional view for showing an essential portion of the glare preventing cover of FIG. 7;

DESCRIPTION OF THE PREFERRED EMBODIMENTS

Figure 3:
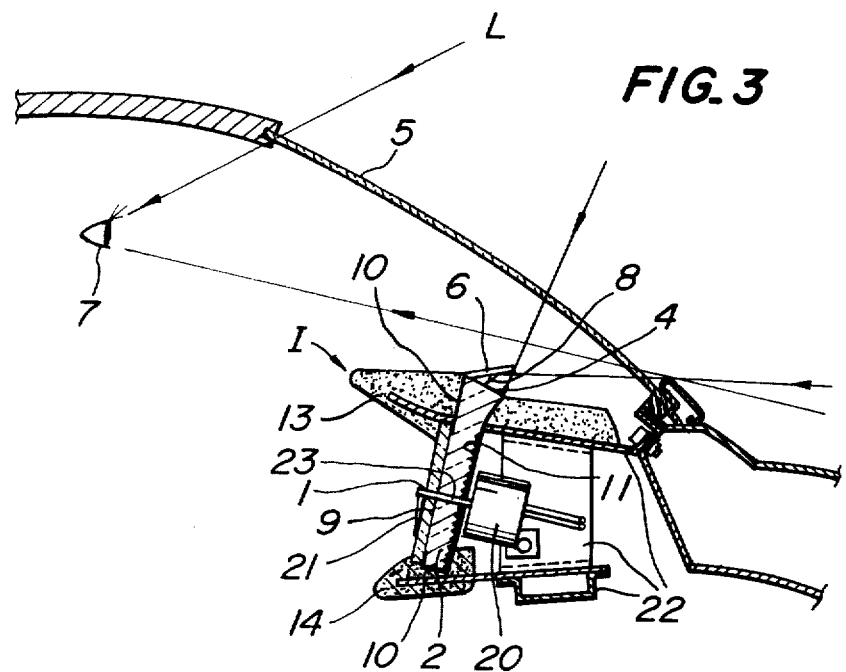
FIG. 3 is a cross-sectional view corresponding to FIG. 2 for explaining a first embodiment of the present invention.

FIGS. 3 to 6 show a first embodiment of the present invention. As shown in this embodiment, a dial 1 is mounted in front of an instrument attached on the instrument panel generally indicated by the Roman reference numeral I. The dial 1 is made of a transparent plate having a good light transparency and attached with indicators such as symbols, characters, numerals or the like. A light guiding member 2 is arranged at the backside of the dial 1 closely fitted therewith. The light guiding member 2 is made of a plate of, for instance, acryl resin having a good light transparency. An axis 23 of the meter is arranged by penetrating the dial 1 and the light guiding member 2. At the indicating end of the axis 23, a pointer 21 is mounted. The pointer 21 is driven via the axis 23 by a movement 20, which is mounted on the instrument panel 22.

Figure 4:
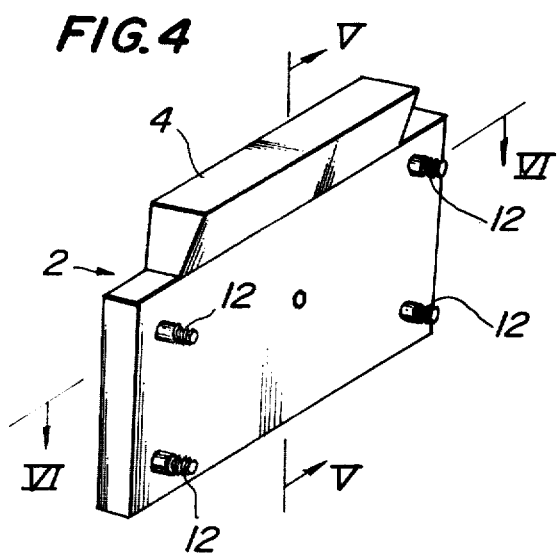
FIG. 4 is a perspective view for showing the light guiding member used in FIG. 3.

The light guiding member 2 has its shape as shown in FIGS. 4 to 6. The member 2 comprises an edge surface 4 being a light collecting or introducing portion onto which the outside light becomes incident and a light emitting surface 9 closely attached to the backside of the dial 1. Besides the abovementioned two surfaces, all the other surfaces of the member 2 are formed as reflecting surface 10 covered with a reflecting film or the like. A rear surface 11, which is located rearwardly from the light emitting surface, is formed to have small wave shaped irregularities or serrations so that the incident light may reflect diffusively and illuminate the indication on the dial 1. At both side portions of the light guiding member 2, and at places not to interrupt the passageway of the incoming outside light, there is provided an internal light source 3 formed of four electric bulbs, for instance, the bulb heads of which are embedded in the member 2. Furthermore, a screen 12 formed of, for instance, a light reflective film is provided at the vicinity of the respective internal light source 3 in order to prevent the internal light emitted from the internal light source 3 not to become incident on the driver's eye 7 directly through an edge of the dial 1. Rather the light passes through the light emitting surface 9 to illuminate the indication on the dial 1. The screen portion 12 is provided to leave a clearance d between the rear surface 11 so as to allow to pass the internal light as shown in FIG. 6.

The light guiding member 2 is so arranged as to penetrate the upper pad 13 of the instrument panel and the edge surface 4 is extruded and exposed above the top surface of the upper pad 13 as shown in FIG. 3. A glare preventing cover 6 is provided on the upper pad 13 of the instrument panel. The cover 6 has its top end extended towards the windshield 5. By this glare preventing cover 6, the outside light reflected by the edge surface 4 or the internal light emitted from the edge surface 4 is prevented from becoming incident directly to the driver's eye 7. The glare preventing cover 6 has an inner surface facing to the edge surface 4 and the inner surface is formed as a reflecting surface.

The light guide member 2 is provided along with the rear side of the dial 1 and inclined in position between the upper pad 13 and the lower pad 14 of the instrument panel. The exposed edge 4 extended from the upper pad 13 is slightly inclined with respect to the windshield 5 in order that the outside light passing through the windshield 5 may easily become incident thereon. As a result, the upper pad 13 is somewhat higher at the inner side or on the driver's side than the windshield side making the edge surface 4 as the boundary.

FIGS. 7 and 8 designate a second embodiment of the present invention. In this embodiment, the edge surface 4 forming the light incoming or introducing portion of the light guiding member 2 is arranged either in close contact with the windshield 5 or in close proximity thereto so that it is made to have a sloped surface to meet with the shape of the windshield 5.

The first and second embodiments of the present invention have the aforementioned construction. By the instrument illuminating device according to the present invention, the outside light falling onto the light guiding member 2 from the edge surface 4 is utilized at a bright place such as the outside in day time. The incident light is reflected at the reflecting surface 10 of the light guiding member 2 or at the rear surface 11 provided with serrations and enters into the dial 1 through the emitting surface 9 to illuminate the indication on the dial 1. A part of the outside light, which had been reflected at the edge surface 4, may be directed towards the driver's eye 7. But such light is interrupted by the glare preventing cover 6 or by the upper pad 13 of the instrument panel so that it will not make trouble for the driver's eye to disturb the driving. Concerning the glare preventing cover 6, the light reflected by its inner surface 8 is again incident to the edge surface 4 or the front direction of the vehicle without coming onto the driver's eye 7.

In a dark place, such as at night time, the internal light source 3 provided at both sides of the light guiding member 2 formed of four lamps may be turned on. The internal light emitted from the internal light source 3 is reflected by the reflecting surface 10 or the rear surface 11 provided with serrations and directed to the dial 1 through the light emitting surface 9 so as to illuminate the designation on the dial 1. In this case the internal light emitted from the internal light source 3 and proceeding towards the driver's eye 7 is at first reflected by the screen 12 and then it passes through the interval d formed between the rear surface 11 of the light guiding member 2 provided with serrations and the top of the screen 12 and is reflected at the rear surface 11 so that the light enters in the dial 1 through the emitting surface 9 and illuminates the indication on the dial 1. In this case also the internal light does not fall on the driver's eye 7 directly.

FIGS. 9 to 11 show a third embodiment of the present invention. In this case, the rear surface 11 of the light guiding member is provided with serrations but the surface is not formed as a reflecting surface by coating for instance a reflecting film. Under the rear surface 11, there is arranged on internal light source 3 formed by a luminescent panel. As shown in the enlarged scale in FIG. 11, a part 16 of the core material 15 of the upper pad 13 of the instrument panel is cut and bent upwardly to form a through hole 17 to allow to pass the upper end portion of the light guiding member 2. The part 16 of the core material 15 is exposed and extended upwardly from the upper pad 13 so as to cover the edge surface 4 of the inserted light guiding member 2 and thus forms a glare preventing cover 6. An inner surface 8 of the glare preventing cover 6 is coated with a reflecting film or is chromium plated to form a reflecting surface. The outer surface thereof is covered by a surface film 19 covering the upper pad 13 supported by the core material 15 to form a non-light reflecting surface.

Accordingly, also in the third embodiment of the present invention, just as in the first and the second embodiments, the outside light may be introduced and utilized in a bright place for instance under day light through the edge surface 4 of the light guiding member 2 to illuminate the indication of the dial 1 and in the dark place, for instance at night time, the internal light source 3 formed of the electro-luminescent panel may be used for illuminating the dial indication on the dial 1. The glare preventing cover 6 in this third embodiment is formed by cutting a part 16 of the core material 15 forming the upper pad 13 of the instrument panel and by bending the same part so that there is no need to provide a glare preventing cover 6 by a separate part. The cover 6 is formed at the same time of its forming with a through hole 17 for passing the upper end of the light guiding member 2 in the core material 15.

Figure 12:
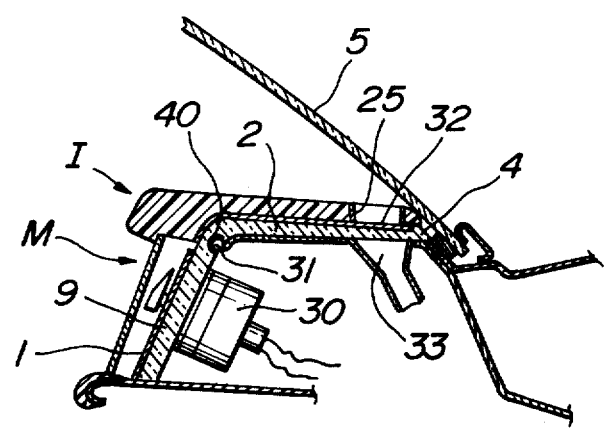
FIG. 12 is a cross-sectional view for showing a further embodiment of the present invention.

FIG. 12 shows a fourth embodiment of the present invention. In this embodiment, a light entrance or introducing edge surface 4 of the light guiding member 2 is located around a lower edge of the windshield 5 and above the upper surface of the defroster nozzle 33. The light guiding member 2 is provided with ventilating recesses at a portion above the nozzle 33 and in proximity with the edge surface 4. The light emitting surface 9 of the light guiding member 2 is arranged at the rear side of the dial 1 of the meter marked with the reference letter M in this figure.

In FIG. 12, a speed meter is indicated as an example. The dial plate 1 of the speed meter M is made of a transparent material. The meter further comprises driving means 30. The light emitting surface 9 of the light guiding member 2 is arranged between the driving means 30 and the dial 1.

Figure 13:
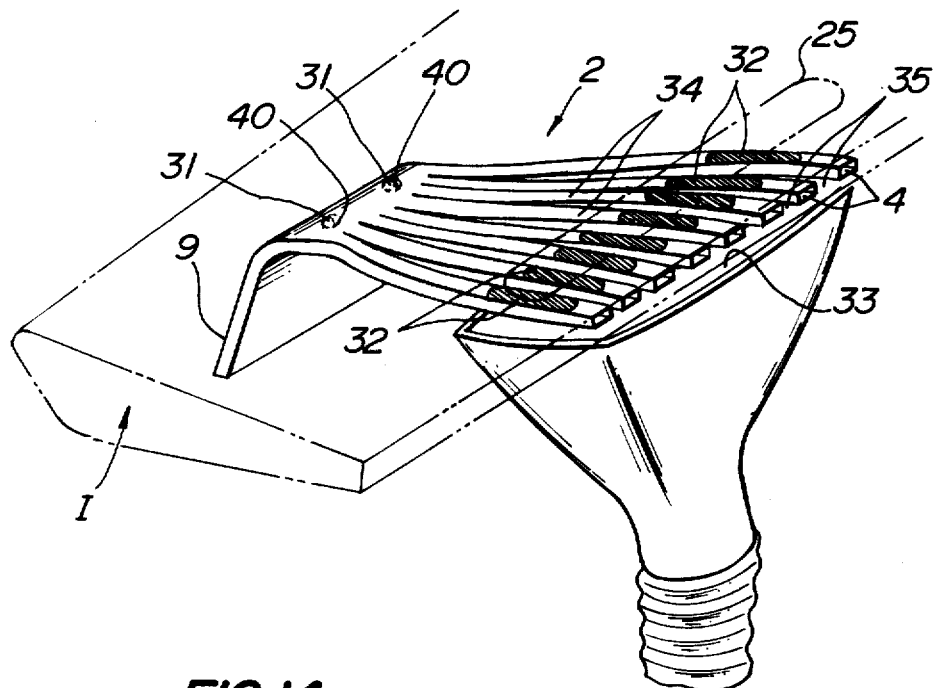
FIG. 13 is a perspective view for showing the light guiding member of FIG. 12.

As can be seen from FIG. 13, the light guiding member 2 is divided into stripes 34 at the side of the light incoming edge 4 to have comb shaped. Between the stripes 34 a number of gaps 35 are formed to allow the defroster outlet air to flow on the windshield 5.

In this case, as a defroster grill 25 is opened at top portion of the instrument panel to match with the defroster nozzle 33, on the upper side of the stripes 34 there is provided with a reflecting film 32 and by this the light in the light guiding member 2 is prevented from entering the windshield 5 to reflect and to disturb the driver's front sight.

Figure 14:
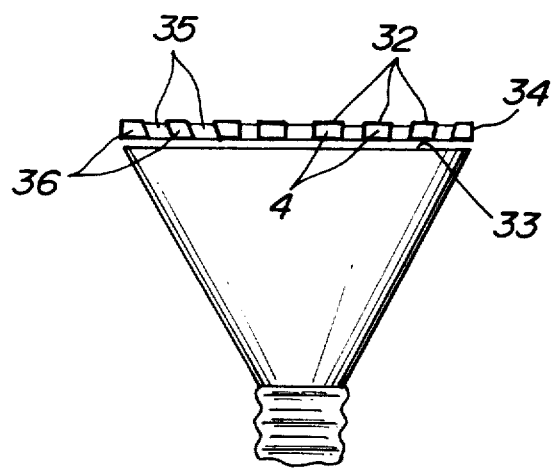
FIG. 14 is a front view thereof.

Furthermore as can be seen from FIG. 14, the defroster air is diffused over the ventilating hole formed of the intervals 35 of the stripes 34 so as to evenly divide the flow of the defroster air to have a guiding fin function to blow the windshield 5.

In this case, the stripes 34 are arranged to have a shape to match the flow of air i.e. to incline from the center of the nozzle towards outsides. In the figure, reference numeral 31 designates an internal light source placed in a hole 40 provided in the member 2. It is preferred to provide reflecting film (not shown) at the side surface of light entrance of the hole 40 so as to prevent emanation of the internal light to the outside.

Figure 15:
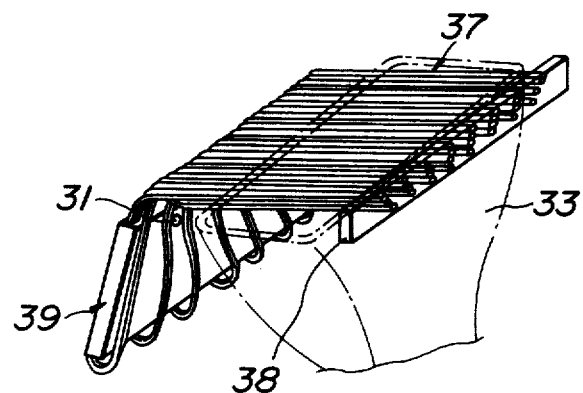
FIG. 15 is perspective view for showing a modified embodiment of the photo-conductive member.

FIG. 15 shows a fifth embodiment of the present invention. In this embodiment, the light introducing part of the light guide member 2 is formed of a number of thin optical fibers 37 bundled in groups to form ventilating openings therebetween.

In other words this embodiment is formed to have separate portions for the light introducing part and the light emitting part. The light emitting surface 39 is formed in a same manner as the previous embodiment. At the light introducing portion, a certain number of the optical fibers are bundled to form a fin shaped structure and arranged over the defroster nozzle to evenly distribute the defroster air as in the previous embodiment. A transparent resin plate 38 is provided to hold the shape of the top of the optical fibers 37. The optical fibers 37 may be fixed by means of an adhesive. The rear end of the optical fibers 37 may be fixed on upper or lower surface (or both of them) of the light emitting surface 39 to guide the light.

When the fibers 37 are fixed to both the upper and lower surfaces of the light emitting surface 39, it is necessary not to disturb the arrangement of the operating means of the meter such as shown by reference numeral 30 in FIG. 12. The internal light source 31 may be mounted in a hole provided at an upper edge side of the light emitting surface 39 of the light guiding member 2. The light source 31 may also be arranged at the outside of the upper edge.

Figure 16:
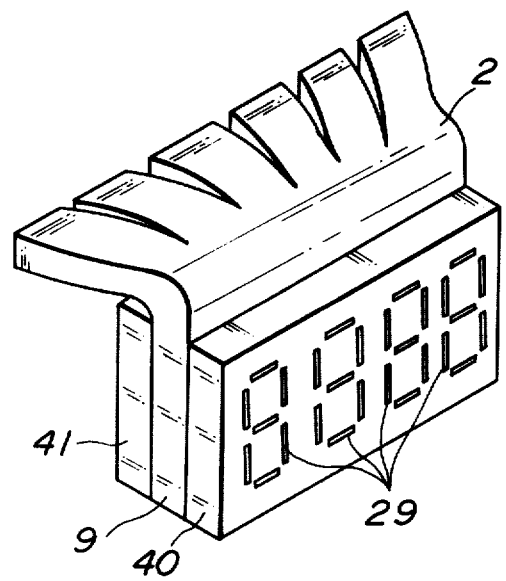
FIG. 16 is a perspective view for showing a different manner of illuminating a dial of an instrument.

FIG. 16 shows a sixth embodiment of the present invention, which is also to illuminate the dial plate of the meter.

The light introducing portion of the light guiding member 2 is likewisely arranged to be branch shaped, as in the previous embodiments. Also the light emitting surface is formed to be flat shaped. In this embodiment, the light emitting surface 9 is sandwiched by a transparent type liquid crystal panel 40 and an electro-luminescent illuminating rear panel 41. By this arrangement, the indication 29 of the dial is made more clear. In this embodiment, the internal light source need not be provided.

In accordance with the present invention, which has the construction as has been described hereinbefore, the outside light can be introduced for illuminating the meter in a bright place such as outside at day time and the internal light may be used in a dark place such as at night time. Therefore, the indication on the dial can always be illuminated and the driver can clearly identify the indication at driving. At a bright place under day light, the amount of outside light incident from the edge surface of the light guiding member is in proportion to the brightness of the driver's view or scenery so that the brightness of the indication on the dial can be made in proportion to the driver's view. Accordingly, the inconvenience in the prior system in that the indication on the dial is invisible or difficult to identify, when the front view is very bright under sunshine compared with the brightness in the compartment, can be avoided. In case of display of a sample vehicle for a long time, the illumination of the dial without charging the source battery can be managed in the present invention by using the illumination in the display chamber or building so that loss of the battery and heat dissipation of the internal light source can be avoided.

By the arrangement of the light guiding member, the internal light source can be provided at a corner portion in the space of the instrument or at the rear side of the light guiding member so that the inner space of the instrument can be used effectively. Further the leakage of the light from the inner space of the instrument is prevented by the use of the light guiding member so that the design of the instrument can be made convenient and flexible.

By the shape and provision angle of the glaring preventing plate, the brightness of the dial can be matched substantially with the mean brightness of the front view so that the driver's eye does not feel delay of response for the difference of the brightness when switching the eye line instantaneously on the dial plate. In other words there is no delay of response of the opening of the pupil for the brightness. Thus the indication on the dial can be identified clearly.

As a conclusion the advantage of the present invention may be summarized below:

(1) The meter indication can be illuminated suitably day and night and it is economical since the day light can be used.

(2) The ventilating holes are provided at a light introducing side of the light conducting member so that the function of the defroster is not interrupted and the arrangement of the light conducting member at the light introducing portion can be made with a great freedom.

(3) The ventilation holes provided at the light introducing portion of the light conducting member have a function to diffuse the air so that the defrosting function is even improved.

(4) The windshield located at the proximity of the light introducing portion can be cleaned very easily by the wipers so that the light efficiency coming from outside may be kept in good order.

Many alternatives of this invention are possible without departing from the scope of the invention as defined in the appended claims.

I claim:

1. An illuminating device for an instrument used in an automotive vehicle comprising a light guiding member arranged at the rear side of a dial mounted at the front surface of the instrument and formed of a transparent plate, liquid crystal or the like, the light guiding member being provided with a light introducing portion facing outside of the vehicle onto which outside light falls, a light guide portion, an illuminating portion closely arranged with the backside of the dial, and an internal light source embedded in part of said member, so that the dial may be illuminated for indication by either of the outside light and the internal light.

2. Illuminating device for instrument as claimed in claim 1, wherein the light introducing portion is extruded from an upper surface of the instrument panel and a glaring preventing cover is provided on the instrument panel to cover said light introducing portion and extending towards windshield so that light reflected at the light introducing portion may not fall directly on the eye of a driver driving vehicle.

3. Illuminating device for instrument as claimed in claim 2, wherein the glaring preventing cover is provided with a reflecting film at inner surface located at the side of the light introducing portion.

4. Illuminating device for instrument as claimed in claim 1, wherein the light introducing portion is covered by an upper pad of the instrument panel in order that the reflecting light will not fall on the driver's eye directly.

5. Illuminating device for instrument comprising a light guiding member arranged at rear side of a dial mounted at front surface of an instrument panel and formed of a transparent plate, liquid crystal or the like, the light guiding member is provided with a light introducing portion onto which outside light falls and with an internal light source provided therein to illuminate the dial, wherein the light introducing portion of the light guiding member is arranged on upper surface of a defroster nozzle near a windshield of a vechicle and the light guiding member is provided with ventilation holes.

6. Illuminating device for instrument as claimed in claim 5, wherein the light guiding member around the light introducing portion is divided into a number of stripe shaped portions arranged over the defroster nozzle.

7. Illuminating device for instrument as claimed in claim 5, wherein the light guiding member is formed of optical fibers at least the light introducing portion.

* * * * *